US012687245B2

(12) United States Patent
Bhathija et al.

(10) Patent No.: US 12,687,245 B2
(45) Date of Patent: Jul. 21, 2026

(54) STRUT CHANNEL ASSEMBLIES FOR INDUSTRIAL FACILITIES AND METHODS OF ASSEMBLING SAME

(71) Applicant: ABB Schweiz AG, Baden (CH)

(72) Inventors: Kuldeep Bhathija, Hyderabad (IN); Prashant Sudhakar Zende, Hyderabad (IN); Kevin Jolly, Cordova, TN (US)

(73) Assignee: ABB Schweiz AG, Baden (CH)

( * ) Notice: Subject to any disclaimer, the term of this patent is extended or adjusted under 35 U.S.C. 154(b) by 65 days.

(21) Appl. No.: 18/649,313

(22) Filed: Apr. 29, 2024

(65) Prior Publication Data

US 2025/0334209 A1 Oct. 30, 2025

(51) Int. Cl.
*F16B 37/04* (2006.01)
*F16L 3/24* (2006.01)

(52) U.S. Cl.
CPC .................................... *F16L 3/243* (2019.08)

(58) Field of Classification Search
CPC ...................................................... F16L 3/243
See application file for complete search history.

(56) References Cited

U.S. PATENT DOCUMENTS

| | | | | |
|---|---|---|---|---|
| 7,984,601 B2 * | 7/2011 | Birnbaum | ................. | E04C 3/09 |
| | | | | 52/843 |
| 9,453,592 B2 * | 9/2016 | Zhang | ................... | F16L 3/1033 |
| 9,790,980 B2 * | 10/2017 | McCarthy | ............. | F16B 37/045 |
| 10,020,773 B2 * | 7/2018 | Molina | ................... | F24S 25/33 |
| 12,262,815 B2 * | 4/2025 | Nilsson | ............... | A47B 95/008 |
| 2014/0260083 A1 | 9/2014 | Zhang et al. | | |

OTHER PUBLICATIONS

Unistrut Service Company, Unistrut P4000—1-5/8" X 13/16", 16 Gauge Metal Framing Strut, Solid; available at https://unistrutohio.com/products/p4000; 3 pp.
Eaton B-Line Strut Systems Full Line Product Catalog; available at https://www.eaton.com/content/dam/eaton/products/support-systems/strut-systems-&-accessories/strut-system-catalog-2018.pdf; pp. 60-61.
Power-Strut Engineering Catalog; available at https://powerstrut.com/Power-Strut-Catalog_2017.pdf; last visited Mar. 20, 2024; pp. 40-41.
Canadian Office Action for Application No. 3,271,104, dated Nov. 17, 2025, 4 pages.

* cited by examiner

*Primary Examiner* — Amy J. Sterling
(74) *Attorney, Agent, or Firm* — McCarter & English, LLP; Michael M. Gnibus

(57) ABSTRACT

A strut channel assembly for constructing a heavy-duty trapeze system in an industrial facility is provided. The strut channel assembly includes an elongated strut channel including a bottom wall, a first side wall, and a second side wall. The first side wall and the second side wall extend from the bottom wall and facing one another, the first side wall forming a first longitudinal rail, the second side wall forming a second longitudinal rail facing the first longitudinal rail. Each of the first longitudinal rail and the second longitudinal rail includes a first elongated rail surface, and a second elongated rail surface intersecting the first elongated rail surface at a non-zero angle. The first longitudinal rail and the second longitudinal rail are configured to facilitate sliding of a nut thereon.

16 Claims, 10 Drawing Sheets

STRUT CHANNEL ASSEMBLIES FOR INDUSTRIAL FACILITIES AND METHODS OF ASSEMBLING SAME

BACKGROUND

The field of the disclosure relates generally to strut channels, and more particularly, to strut channel assemblies for industrial facilities.

Strut channels are used to mount, brace, support, and connect structural loads in building construction. In an industrial facility, such as a warehouse, strut channels are used to construct a trapeze system of mechanical structures to provide mechanical support for mechanical loads such as pipes or conduits. Known strut channel assemblies are disadvantaged in some aspects and improvements are desired.

BRIEF DESCRIPTION

In one aspect, a strut channel assembly for constructing a heavy-duty trapeze system in an industrial facility is provided. The strut channel assembly includes an elongated strut channel including a bottom wall, a first side wall, and a second side wall. The first side wall and the second side wall extend from the bottom wall and facing one another, the first side wall forming a first longitudinal rail, the second side wall forming a second longitudinal rail facing the first longitudinal rail. Each of the first longitudinal rail and the second longitudinal rail includes a first elongated rail surface, and a second elongated rail surface intersecting the first elongated rail surface at a non-zero angle. The first longitudinal rail and the second longitudinal rail are configured to facilitate sliding of a nut thereon.

In another aspect, a strut channel assembly for constructing a heavy-duty trapeze system of an industrial facility is provided. The strut channel assembly includes an elongated strut channel formed as one single piece. The strut channel includes a bottom wall, a first side wall, and a second side wall. The first side wall and the second side wall extend from edges of the bottom wall along a longitudinal direction of the bottom wall, the first side wall and the second side wall facing one another, the first side wall forming a first longitudinal rail, and the second side wall forming a second longitudinal rail facing the first longitudinal rail. The strut channel assembly further includes a nut positioned inside the strut channel and coupled with the strut channel along the first longitudinal rail and the second longitudinal rail.

In one more aspect, a method of assembling a strut channel assembly for a heavy-duty trapeze system of an industrial facility is provided. The method includes forming an elongated strut channel as one single piece. The strut channel includes a bottom wall, a first side wall, and a second side wall. The first side wall and the second side wall extend from edges of the bottom wall along a longitudinal direction of the bottom wall, the first side wall and the second side wall facing one another, the first side wall forming a first longitudinal rail, and the second side wall forming a second longitudinal rail facing the first longitudinal rail. The method further includes forming a nut. The method also includes coupling the nut with the strut channel along the first longitudinal rail and the second longitudinal rail.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes strut channel assemblies and methods of assembling strut channel assemblies. Method aspects will be in part apparent and in part explicitly discussed in the following description.

Figures 1A, 1B, 1C, 1D:
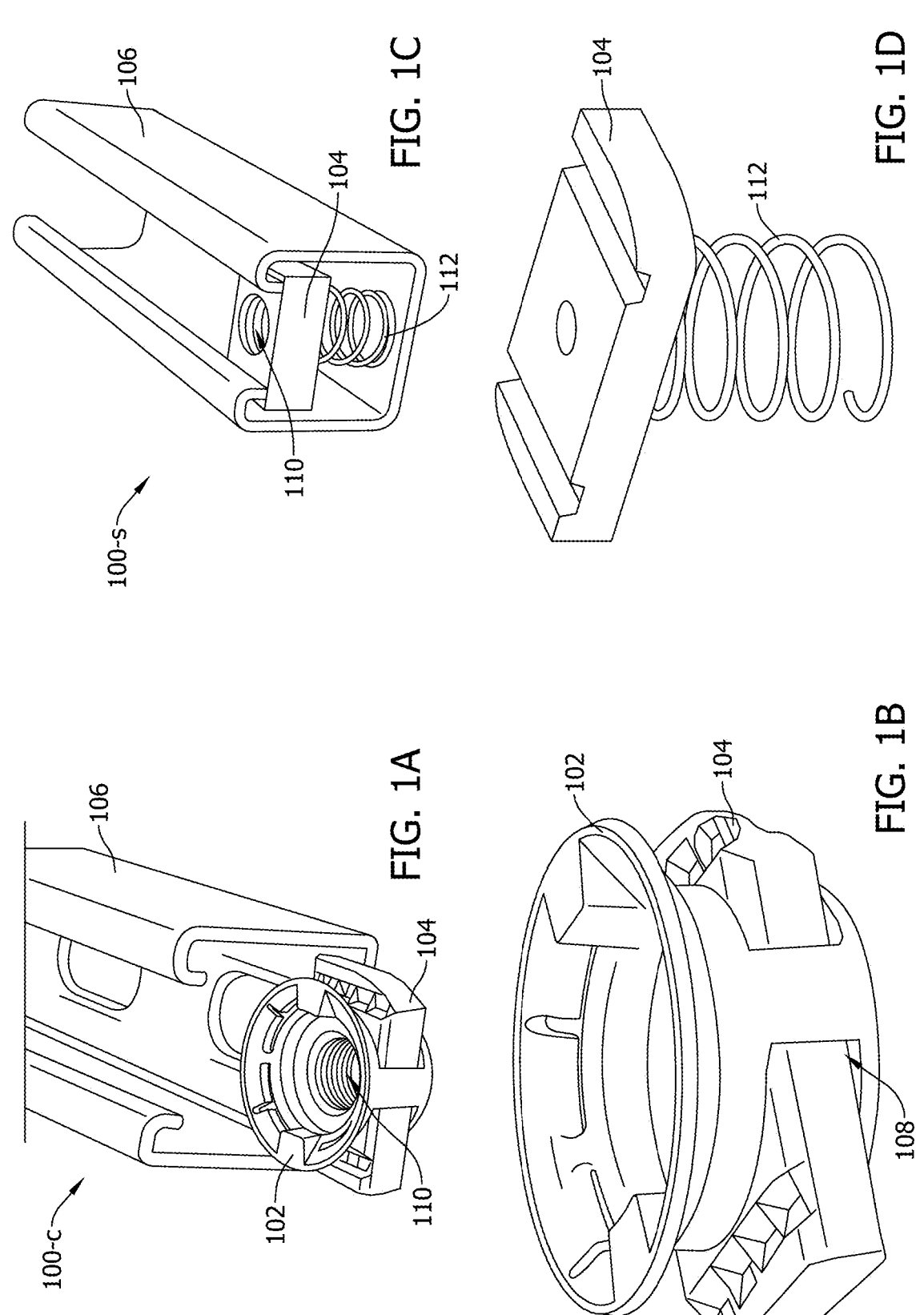
FIG. 1A shows a known strut channel assembly before a nut and a cone of the strut channel assembly are assembled into a strut channel of the strut channel assembly.
FIG. 1B is a perspective view of the nut and the cone shown in FIG. 1A by themselves.
FIG. 1C shows another known strut channel assembly.
FIG. 1D shows a nut and a spring of the strut channel assembly shown in FIG. 1C.

FIGS. 1A and 1B show a known strut channel assembly 100-c. FIG. 1A shows the strut channel assembly 100-c before a cone 102 and a nut 104 of the strut channel assembly 100 are coupled with a strut channel 106 of the strut channel assembly 100. FIG. 1B is a perspective view of the nut 104 and the cone 102 by themselves. The strut channel assembly 100-c includes a standard strut channel 106. The strut channel assembly 100-c also includes the nut 104 and the cone 102. The cone 102 defines a cone aperture 108 sized to receive the nut 104 therethrough. The nut 104 has a width slightly smaller than the width of the strut channel 106 such that the nut 104 may be moved along the strut channel 106. To assemble the nut 104 with the strut channel 106, the nut 104 is inserted through the cone aperture 108 and held by the cone 102, and then the assembly of the cone 102 and the nut 104 is inserted into the strut channel 106. The nut 104 includes a nut aperture 110 sized to receive a mechanical structure in construction of mechanical and/or electrical structural support.

FIGS. 1C and 1D show another known strut channel assembly 100-s. FIG. 1C shows the strut channel assembly 100-s. FIG. 1D is a perspective view of an assembly of the nut 104 with a spring 112. The strut channel assembly 100-s includes the standard strut channel 106, the nut 104, and the spring 112. To assemble the nut 104 with the strut channel 106, the spring 112 is coupled with the nut 104, and then the assembly of the nut 104 and the spring 112 is inserted into the strut channel 106.

In the known strut channel assemblies 100-c, 100-s, an additional part, such as the cone 102 or the spring 112, is required in order to assemble the nut 104 with the strut channel 106, increasing the costs in parts. Further, an additional process of assembling the nut 104 with the additional part is required before coupling the nut 104 with the strut channel 106, further increasing the costs from the added labor. Assembling the spring 112 with the nut 104 may pose a safety hazard as the spring may fly if the spring is not secured with the nut 104 during the assembling process. The spring 112 may become stuck in the strut channel 106, preventing positioning the nut 104 to a desired location at the strut channel. Further, retrieving and/or relocating a stuck spring 112 through the strut channel 106 is tedious.

In contrast, the assemblies and methods disclosed herein address the above problems in at least some known strut channel assemblies. Additional parts may be eliminated, reducing costs from parts. The assembling process of a nut with the strut channel is simplified, thereby reducing costs in labor. The strut channel include rails configured to couple with the nut. In some embodiments, the nut slidably couples with the strut channel along the rails, facilitating repositioning of the nut in the strut channel. The rails are configured to self-center the nut in the strut channel such that the likelihood of the nut being stuck in and/or dislocated from the strut channel is reduced.

Figures 2A, 2B, 2C, 2D:
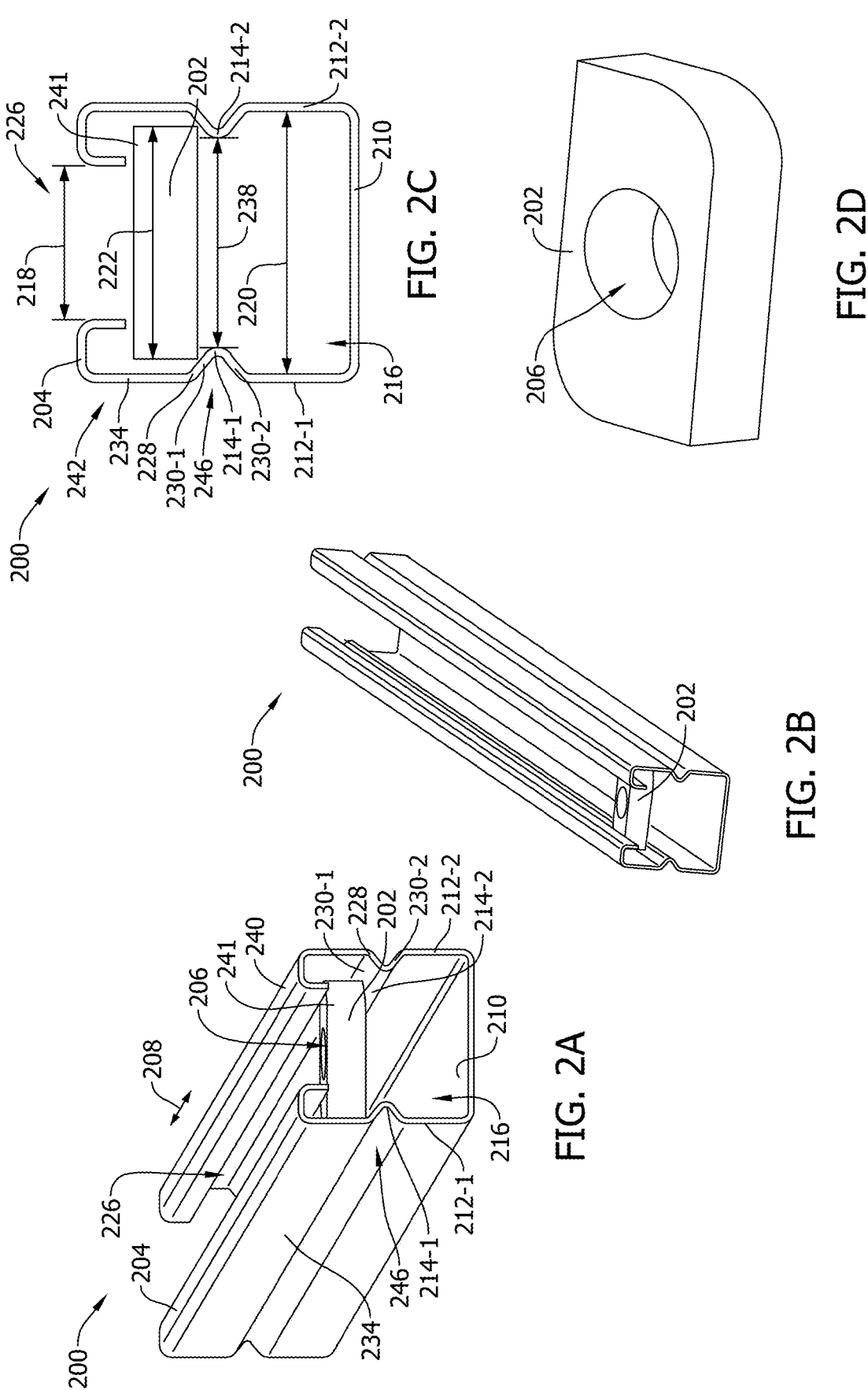
FIG. 2A is a perspective view of an example strut channel assembly.
FIG. 2B is another perspective view of the strut channel assembly shown in FIG. 2A when viewed from a different angle than that in FIG. 2A.
FIG. 2C is a front view of the strut channel assembly shown in FIG. 2A.
FIG. 2D is a perspective view of an example nut of the strut channel assembly shown in FIG. 2A.

FIGS. 2A-2D show an example strut channel assembly 200. FIG. 2A is a perspective view of the strut channel assembly 200. FIG. 2B is another perspective view of the strut channel assembly 200 when viewed from an angle different than that in FIG. 2A. FIG. 2C is a front view of the strut channel assembly 200. FIG. 2D is a perspective view of a nut 202 of the strut channel assembly 200.

In the example embodiment, the strut channel assembly 200 includes only the strut channel 204 and the nut 202. An additional part is not needed in order to assemble the nut 202 with the strut channel 204. The nut 202 may be a standard nut available in the market. The nut 202 may be fabricated with metal or non-metal material. The nut 202 defines a nut aperture 206 sized to receive a mechanical support in constructing a mechanical trapeze system for mechanical and/or industrial structures of a building.

In the example embodiment, the strut channel 204 may be formed as one single piece. The strut channel 204 may be fabricated from metal, such as steel. The strut channel 204 may be fabricated from non-metal material, such as plastic. The strut channel 204 is elongated along a longitudinal direction 208.

In the example embodiment, the strut channel 204 includes a bottom wall 210. In the depicted embodiment, the bottom wall 210 includes a solid surface. In some embodiments, the bottom wall 210 defines one or more apertures (not shown) sized to receive part of a structure to be coupled with the nut 202.

In the example embodiment, the strut channel 204 further includes a first side wall 212-1 and a second side wall 212-2. The bottom wall 210, the first side wall 212-1, and the second side wall 212-2 are elongated along the longitudinal direction 208. The first side wall 212-1 extends from a first edge 214-1 of the bottom wall 210. The second side wall 212-2 extends from a second edge 214-2 of the bottom wall 210. The second edge 214-2 is positioned opposite the first edge 214-1. The first side wall 212-1 and the second side wall 212-2 face one another. The bottom wall 210 and the side walls 212 define a longitudinal passage 216 sized to receive the nut 202 therein. The side wall 212 may be curved one or more times and define a channel opening 226 at the top of the strut channel 204. The width 218 of the channel opening 226 is narrower than the width 220 of the passage 216 at other depths of the strut channel 204, such as depths between the rail 228 and the channel opening 226. The width 220 of the passage 216 is the distance 220 between the side walls 212 at the widest depth. The width 218 of the channel opening 226 is also smaller than the width 222 of the nut 202. As such, when the nut 202 is received in the strut channel 204, the nut 202 is restricted from sliding out of the channel opening 226.

In the example embodiment, the side wall 212 includes a rail 228. The rail 228 on the first side wall 212-1 face the rail 228 on the other side wall 212-2. The rails may be parallel to one another. The rail 228 may be elongated in the longitudinal direction 208. The rails 228 facilitate coupling the nut 202 with the strut channel 204. The rails 228 also increase the strength of the strut channel 204, increasing permissible loads on the strut channel 204.

In the example embodiment, the rail 228 may include a first elongated rail surface 230-1 and a second elongated rail surface 230-2. The elongated rail surfaces 230 may extend along the longitudinal direction 208. The rail surface 230 may be slanted from a remainder 234 of the side wall 212. The rail surface 230 may be at a non-zero angle with the remainder 234. For example, the rail surface 230 is at a 45° angle with the remainder 234. The rail surface 230 may be at other angles with the remainder 234, such as 30° or 55°, that enable the strut channel assembly 200 to function as described herein. The first elongated rail surface 230-1 is at a non-zero angle with the second elongated rail surface 230-2. The first rail surface 230 may be at a 90° angle with the second rail surface 230. The rail surfaces 230 may form into other angles, such as 60° or 100°, that enable the strut channel assembly 200 to function as described herein. The elongated rail surfaces 230 intersect and form an rail edge 214. The rail edge 214 may be elongated along the longitudinal direction 208. The rail edge 214 on the first side wall 212 may be parallel with the rail edge 214 on the second side wall 212. The rail 228 may be positioned further inward into the passage 216 than remainders 234 of the side walls 212, where the rail edges 214 are positioned further inward into the passage 216 than the remainders 234, and the profiles of the side walls are concave. The width 222 of the nut 202 is smaller than the distance 220 between the side walls 212, but is greater than the distance 238 between the rail edges 214, such that the nut 202 may be inserted into the strut channel 204 with ends 241 of the nut 202 positioned on the rails 228. In some embodiments, the rails 228 may be positioned further outward than the remainders 234 of the side walls 212, where the rail edges 214 are positioned further outward than the remainders 234, and the profiles of the side walls 212 are convex. The width 222 of the nut 202 is smaller than the distance 220 between the side walls 212, and is also smaller than the distance 238 between the rail edges 214, such that the nut 202 may be inserted into the strut channel 204 with ends 241 of the nut 202 positioned between the first and second rail surfaces 230 of the rails.

In the depicted embodiment, the rail 228 has a profile resembling letter V, with the tip of letter V at the rail edge 214. The tip of letter V may face inward. Alternatively, the tip of letter V may face outward. The rail edge 214 may be rounded. The rail 228 may be in other profiles, such as a square or a rectangular, that enable the strut channel assembly 200 to function as described herein.

In the example embodiment, the rails 228 of the strut channel 204 are configured to self-center the nut 202 when the nut 202 is positioned along the rails 228, such that the nut 202 does not slant toward one of the rails 228 or become stuck in or dislocated from the strut channel 204. A front profile 242 of the strut channel 204, a profile of the strut channel 204 when viewed from the front, may be symmetrical. The slopes of the first rail surfaces 230 on both side walls or the slopes of the second rail surfaces 230 on both side walls 212 may be the same. When the nut 202 is positioned on the rails 228, by being either on the first rail surfaces 230 or the second rail surfaces 230, the nut 202 is centered in the strut channel 204.

In operation, to assemble the nut 202 with the strut channel 204, the nut 202 is inserted into the strut channel 204 at an end 240 of the strut channel 204. The nut 202 may be slid along the rails 228 to position the nut 202 at a desired location at the strut channel 204. The nut 202 may be retained in the passage 216 between the channel opening 226 and the rails 228 or between rail surfaces 230 of the rails. In some embodiments, the nut 202 may be inserted into the strut channel 204 at a position away from the end 240 of the strut channel 204 by inserting the nut 202 into the passage 216 through the channel opening 226 and then repositioning the nut 202 to be along the rail 228.

To remove the nut 202 from the strut channel 204, the nut is slid along the rails 228 and out of the strut channel 204. In some embodiments, the nut 202 may be removed from the strut channel 204 at a location away from the ends 240 of the strut channel 204 by positioning the nut 202 into a slanted position and then removing the nut 202 from the channel opening 226.

The strut channel 204 may be fabricated by a metal fabrication mechanism, such as metal forming or metal stamping. For example, the strut channel 204 may be formed by rolling, where the material is passed through rollers. The rail 228 having a profile resembling letter V is advantageous in reducing the complexity in manufacturing by rolling, where the indentation 246 at the rail edge 214 may be readily formed by a roller and the angle of the indentation 246 may be readily controlled by the shapes of the rollers. Forming an indentation 246 having a profile resembling letter V reduces the number of manufacturing processes, compared to other profiles, such as rectangular profiles. To form an indentation 246 having a profile resembling letter V may only need one or two processes of compressing the material against rollers having shapes complementary to the profile. A rail having a profile resembling letter V may also save the amount of material in manufacturing the rail, compared to a rail having other profiles. In some embodiments, the strut channel 204 may be fabricated by molding or extruding.

The strut channel assemblies 200 may be used in an industrial building to provide heavy-duty support for industrial trapeze systems. A trapeze system is an assemble of mechanical structures in a facility that forms framing, grids, and/or bracing and provide support for pipes, conduits, ducts, or other structures in the facility. "Heavy-duty" as used herein refers to mechanical structures suitable for industrial facilities to support relatively heavy loads. The thickness of the side walls may be 12 gauges (2.6 mm) or 14 gauges (2 mm). In known strut channel assemblies for light loads, the thickness of the side walls of the strut channel are typically 14 gauges or higher (2 mm or less). Because the side walls are relatively thin, reinforcing ribs are used in known light-duty strut channel assemblies. Such reinforcing ribs would be redundant for heavy duty strut channel assemblies 200, where the side walls 212 are thick enough to withstand the industrial loads. A person in the field, therefore, would not have been motivated to include reinforcing ribs in known heavy-duty strut channel assemblies.

In some embodiments, the strut channel 204 by itself may be used in assembling a trapeze system. For example, the strut channel 204 may be assembled with a pipe using a pipe strap, without the need of a nut.

Figure 3:
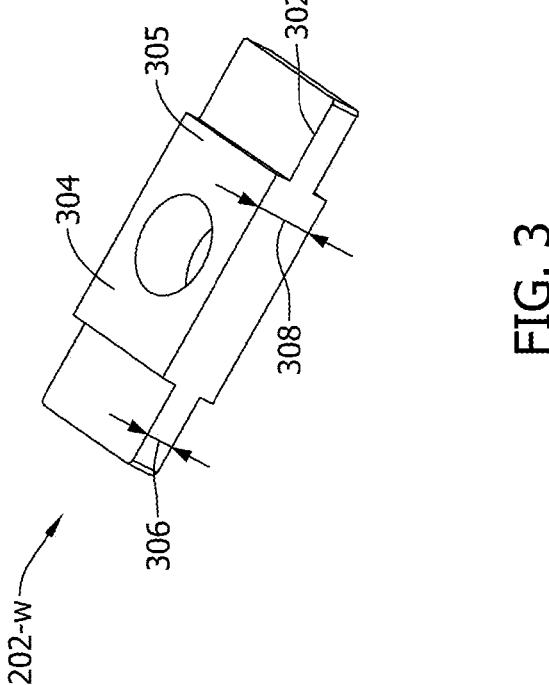
FIG. 3 is a perspective view of another example nut.

FIG. 3 shows another embodiment of the nut 202-w. Compared to the nut 202 shown in FIGS. 2A-2D, the nut 202-w includes wings 302. In the example embodiment, the nut 202 includes a nut body 304 and the wings 302 positioned at ends 305 of the nut body 304. The wing 302 has a smaller thickness 306 than a thickness 308 of the nut body 304.

Figures 4A, 4B, 4C:
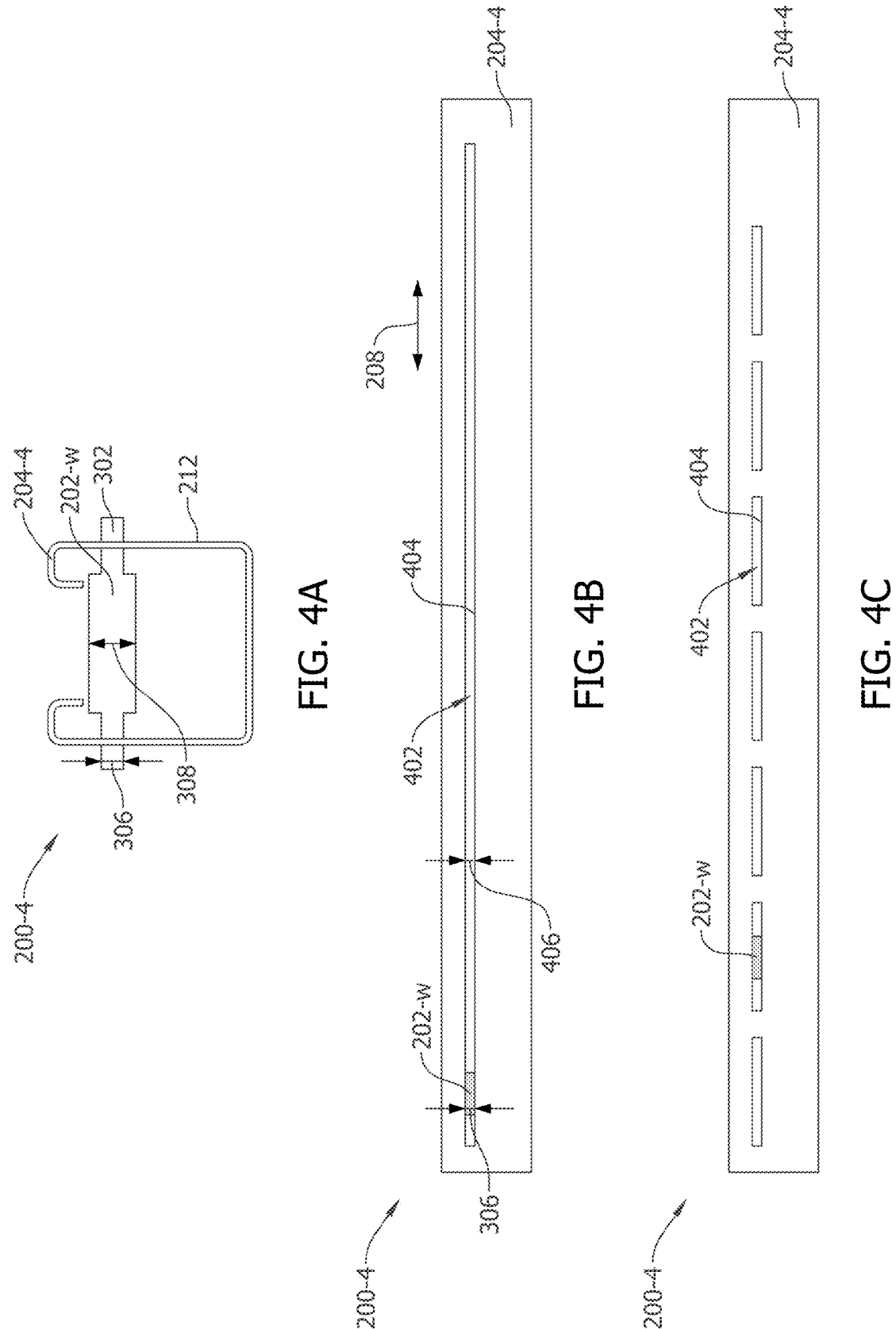
FIG. 4A is a front view of an example strut channel assembly that includes the nut shown in FIG. 3.
FIG. 4B is a side view of an example embodiment of the strut channel assembly shown in FIG. 4A.
FIG. 4C is a side view of another example embodiment of the strut channel assembly shown in FIG. 4A.

FIGS. 4A-4C show an example strut channel assembly 200-4 that includes the nut 202-w. FIG. 4A is a front view of the strut channel assembly 200-4. FIG. 4B is a side view of an example embodiment of the strut channel assembly 200-4 shown in FIG. 4A. FIG. 4C is a side view of another example embodiment of the strut channel assembly 200-4 shown in FIG. 4A.

In the example embodiments, compared to the strut channel 204 shown in FIGS. 2A-2C, the rails 228 of the strut channel 204-4 include slot edges 404 of the slots 402, where the nut 202 may be slid along the slot edges 404. The side wall 212 of the strut channel 204-4 defines the elongated slot 402. A plurality of slots 402 may be defined in one side wall 212 (FIG. 4C). The slots 402 may be along the longitudinal direction 208. The slot 402 is sized to receive the wing 302 therethrough. The slot or slots 402 on one side wall 212 face the slot or slots 402 on the other side wall 212. The width 406 of the slot 402 is greater than the thickness 306 of the wing 302 but is smaller than the thickness 308 of the nut body 304. As such, the nut 202 is coupled with strut channel 204-4 with the wings 302 received in the slot 402. and is restricted from dislocating from the strut channel 204-4 by the nut body 304.

In operation, to couple the nut 202-w with the strut channel 204-4, the wings 302 of the nut 202 are inserted into the slots 402 one at a time. The nut 202-w may be slid along the slots 402 to position the nut 202-w at a desired location. The position of the nut 202-w at the strut channel 204-4 may be limited to a specific slot 402 (FIG. 4C).

Figures 5A, 5B:
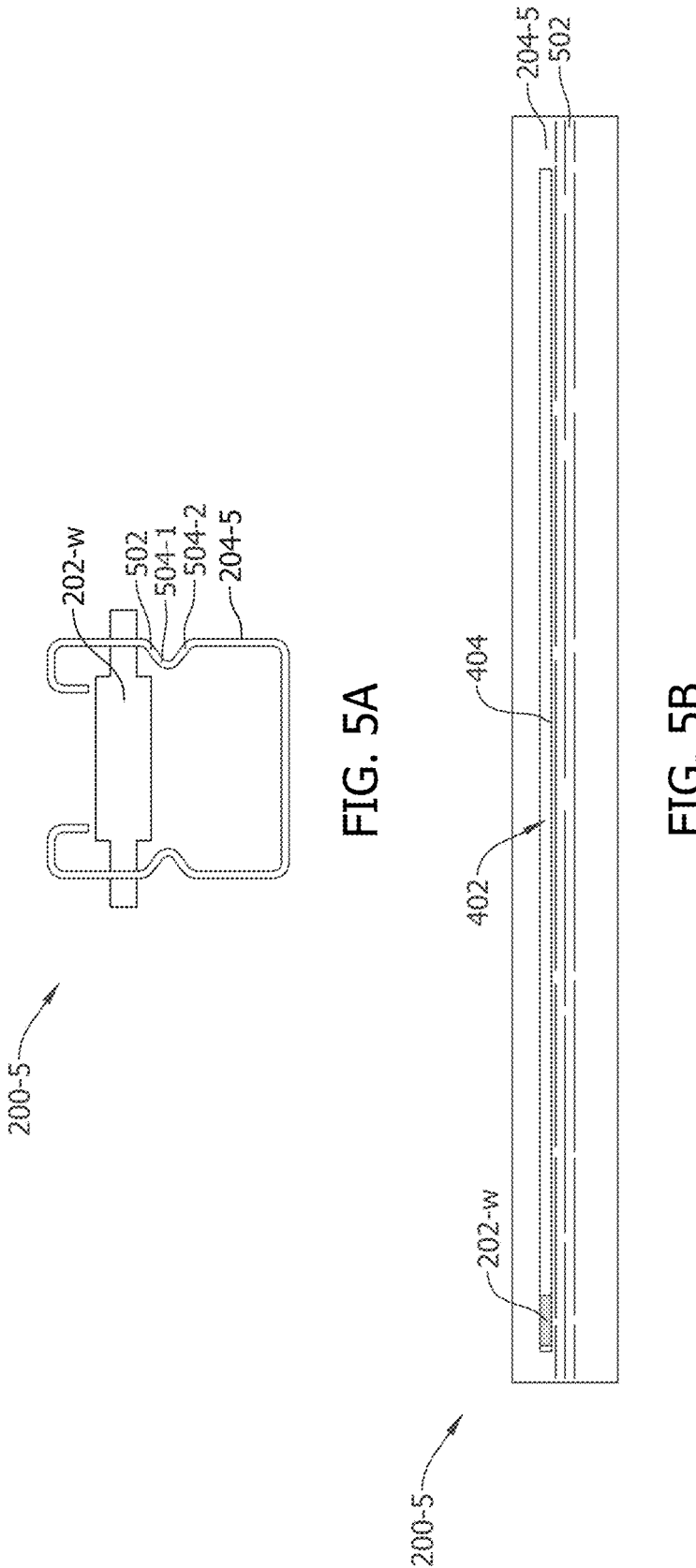
FIG. 5A is a front view of another example strut channel assembly that includes the nut shown in FIG. 3.
FIG. 5B is a side view of the strut channel assembly shown in FIG. 5A.

FIGS. 5A and 5B show another example strut channel assembly 200-5 that includes the winged nut 202-w. FIG. 5A is a front view of the strut channel assembly 200-5. FIG. 5B is a side view of the strut channel assembly 200-5. In the example embodiment, compared to the strut channel 204-4 shown in FIGS. 4A-4C, the strut channel 204-5 further includes a rib 502. The rib 502 includes a first elongated rib surface 504 and a second elongated rib surface 504. The first and second rib surfaces 504 intersect at a non-zero angle. The slots 402 may weaken the strength of the side walls 212. The ribs 502 are included to increase the strength of the side walls 212. In the depicted embodiment, the rib 502 extends the entire longitudinal length of the side wall 212. In some embodiments, the rib 502 may extend a partial longitudinal length of the side wall 212. In other embodiments, the rib 502 may be in segments with each segment extending a partial longitudinal length of the side wall 212.

Figure 6:
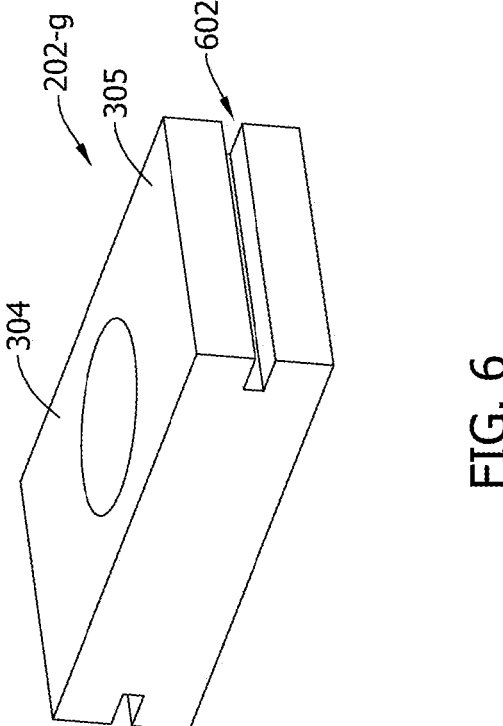
FIG. 6 is a perspective view of one more example nut.

FIG. 6 shows one more example nut 202-*g*. In the example embodiment, compared to the nuts 202, 202-*w* shown in FIGS. 2A-3, the nut 202-*g* defines a groove 602 at each end 305 of the nut body 304.

Figures 7A, 7B, 7C, 7D:
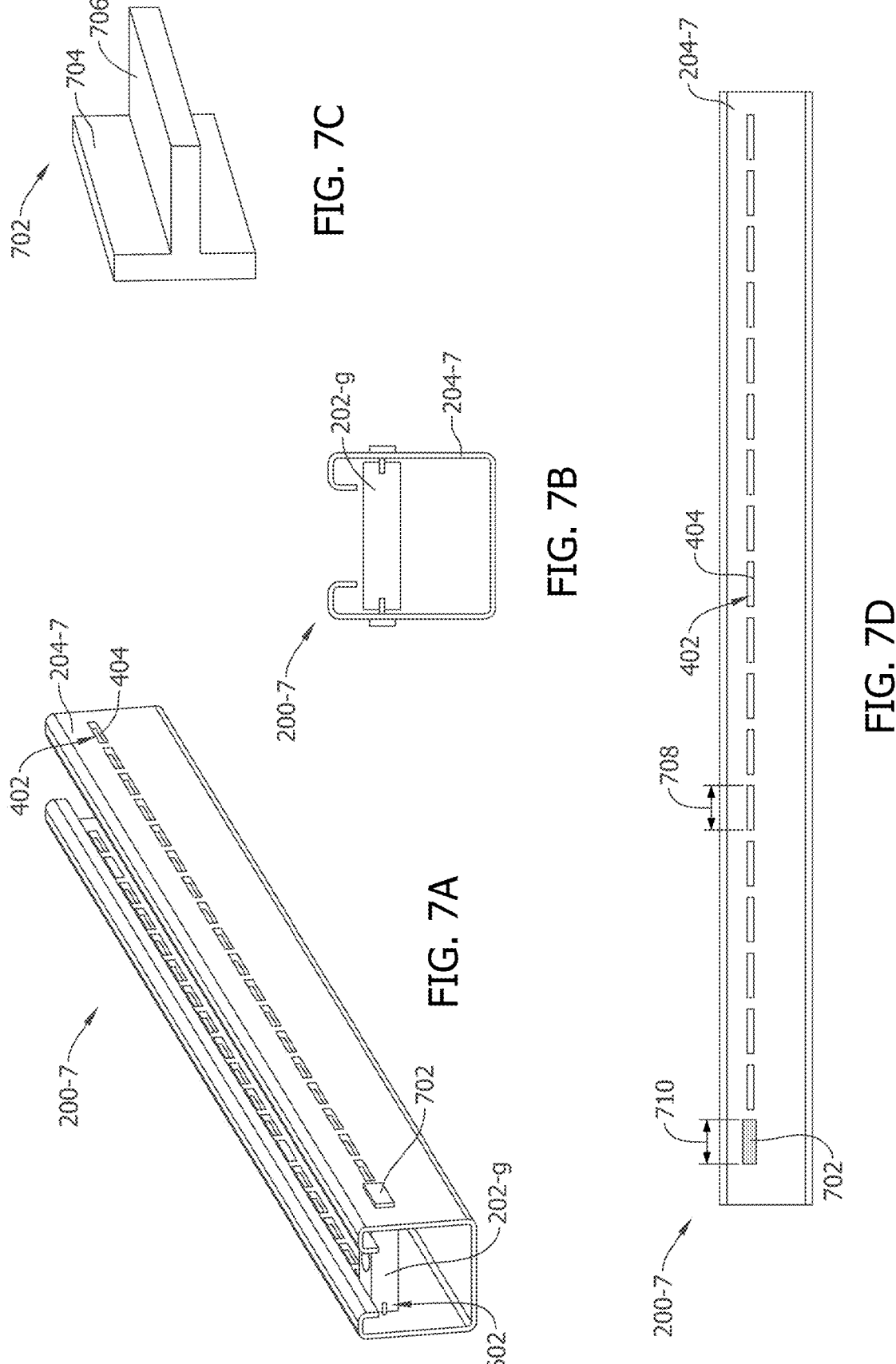
FIG. 7A is a perspective view of an example strut channel assembly that includes the nut shown in FIG. 6.
FIG. 7B is a front view of the strut channel assembly shown in FIG. 7A.
FIG. 7C is a perspective view of a nut holder of the strut channel assembly shown in FIG. 7A.
FIG. 7D is a side view of the strut channel assembly shown in FIG. 7A.

FIGS. 7A-7D show an example strut channel assembly 200-7 that includes the nut 202-*g*. FIG. 7A is a perspective view of the strut channel assembly 200-7. FIG. 7B is a front view of the strut channel assembly 200-7 shown in FIG. 7A. FIG. 7C is a perspective view of a nut holder 702 of the strut channel assembly 200-7. FIG. 7D is a side view of the strut channel assembly 200 shown in FIG. 7A.

In the example embodiment, the strut channel 204-7 includes one or more slots 402. The rails 228 include slot edges 404 of the slots 402. The nut 202 is coupled along the slot edges 404. The strut channel assembly 200 further includes the nut holders 702. The nut holder 702 includes a holder body 704 and a tab 706. The tab 706 extends from the holder body 704 at a non-zero angle with the holder body 704. The tab 706 may be perpendicular to the holder body 704. The tab 706 is sized to be received in one of the longitudinal slots 402. The tab 706 is also sized to be received in one of the grooves 602 of the nut 202. The length 708 of the slot 402 may be approximately the same as the length 710 of the tab 706, such that the movement of the nut 202 is restricted after the nut 202 is assembled with the strut channel 204-7. In the depicted embodiment, the tab 706 extends the entire length of the holder body 704 such that at the side of the nut holder 702, the holder body 704 and the tab 706 are flush. In some embodiments, the tab 706 extends a partial length of the holder body 704 such that at the side of the nut holder 702, the holder body 704 projects further outward than the tab 706.

In operation, to assemble the nut 202 with the strut channel 204-7, the nut 202 is received in the passage 216 of the strut channel 204-7. Nut holders 702 are coupled to ends 305 of the nut body 304 by positioning the holder bodies 704 outside the strut channel 204-7 and inserting the tabs 706 through the slots 402 and into the grooves 602 of the nut 202. When assembled, the nut holders 702 hold the nut 202 with the strut channel 204-7. The positioning of the nut 202 may be adjusted by coupling the nut 202 at a desired slot 402.

Figures 8A, 8B, 8C:
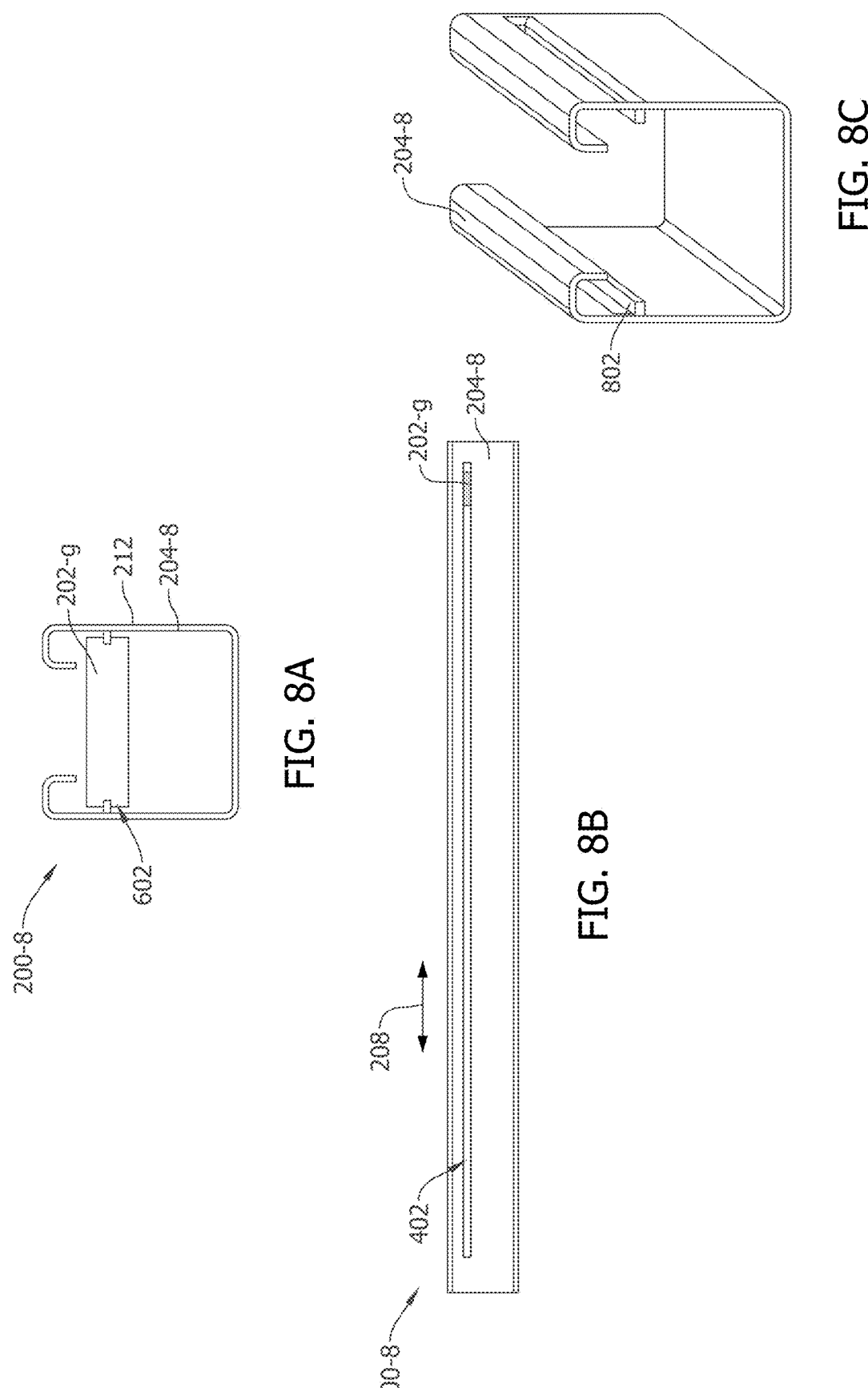
FIG. 8A is a front view of another example strut channel assembly that includes the nut shown in FIG. 6.
FIG. 8B is a side view of an example embodiment of the strut channel assembly shown in FIG. 8A.
FIG. 8C is a perspective view of an example strut channel in the strut channel assembly shown in FIG. 8B.
Figures 8D, 8E:
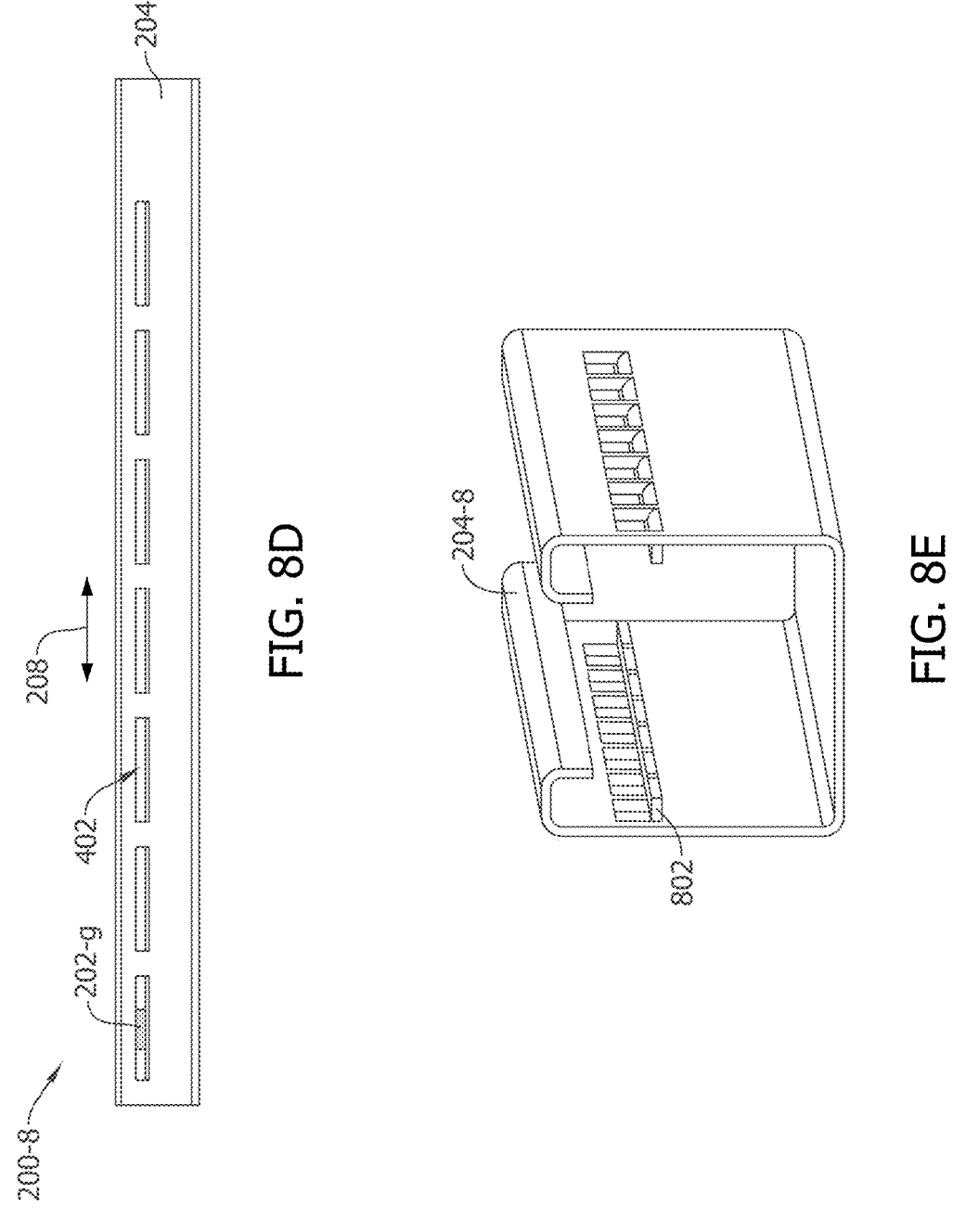
FIG. 8D is a side view of another example embodiment of the strut channel assembly shown in FIG. 8A.
FIG. 8E is a perspective view of an example strut channel in the strut channel assembly shown in FIG. 8D.

FIGS. 8A-8E show another strut channel assembly 200-8 that includes the nut 202-*g*. FIG. 8A is a front view of the strut channel assembly 200-8. FIG. 8B is a side view of an example embodiment of the strut channel assembly 200-8 shown in FIG. 8A. FIG. 8C is a perspective view of an example strut channel 204 in the strut channel assembly 200-8 shown in FIG. 8B. FIG. 8D is a side view of another example embodiment of the strut channel assembly 200-8 shown in FIG. 8A. FIG. 8E is a perspective view of an example strut channel 204 in the strut channel assembly 200-8 shown in FIG. 8D.

In the example embodiment, compared to the strut channel 204-7 shown in FIGS. 7A, 7B, and 7D, the strut channel

204-8 further includes a ledge 802. The rails 228 include the ledges 802. The nut 202 is coupled along the ledges 802. The nut 202 may be slid along the ledges 802. The ledge 802 extends from an interior of the side wall 212. The ledge 802 may extend along the longitudinal direction 208 of the strut channel 204-8. The strut channel 204-8 may include a plurality of ledges 802 (FIGS. 8D and 8E). The ledge 802 on one of the side walls 212 faces the ledge 802 on the other side wall 212, and may be parallel to the corresponding ledge 802 on the other side wall 212. The ledge 802 may be formed by cutting the side wall 212 to define slots 402 and then bend the cut portions of the side walls 212 to form the ledges 802.

In operation, to assemble the nut 202 with the strut channel 204-8, the nut 202 is inserted into the strut channel 204-8 with the ledges 802 inserted into the grooves 602 of the nut 202. The position of the nut 202 on the strut channel 204-8 may be adjusted by sliding the nut 202 to a desired location on the ledge 802 or to a corresponding ledge 802 for the desired location.

In the depicted embodiments, the bottom wall 210 of the strut channel 204 (see FIGS. 4A, 5A, 7A, 7B, 8A, 8C, and 8E) includes a solid surface. In some embodiments, the bottom wall 210 defines one or more apertures (not shown) sized to receive a structure to be coupled with the nut 202.

The strut channel assemblies 200, 200-4, 200-5, and 200-8 eliminate accessories, such as the cone 102 or the spring 112 in known strut channel assemblies 100, for assembling the nut 202 with the strut channel 204, thereby reducing the cost of parts. With the elimination of accessories the assembling of the nut 202 with the strut channel 204 is simplified, where to assemble the nut 202 with the strut channel 204, the nut 202 needs only to be inserted into the strut channel, without first being assembled with the accessory, thereby reducing the costs in labor. The strut channel assembly 200 shown in FIGS. 2A-2D may include a standard or preexisting nut 202 in a preexisting strut channel, thereby facilitate retrofitting of the strut channels 204 into preexisting strut channel assemblies.

The strut channel assemblies 200-7 includes an accessary of a nut holder 702. Compared to known strut channel assemblies 100, the assembling of the nut 202 with the strut channel 204 is still simplified, where the nut 202 is inserted into the strut channel 204 and held in place at a desired location by nut holders 702. Preassembling the nut 202 with the nut holder 702 is not needed. The assembling process does not involve safety risks and drawbacks associated with the spring 112 in the known strut channel assembly 100-*s*.

Figure 9:
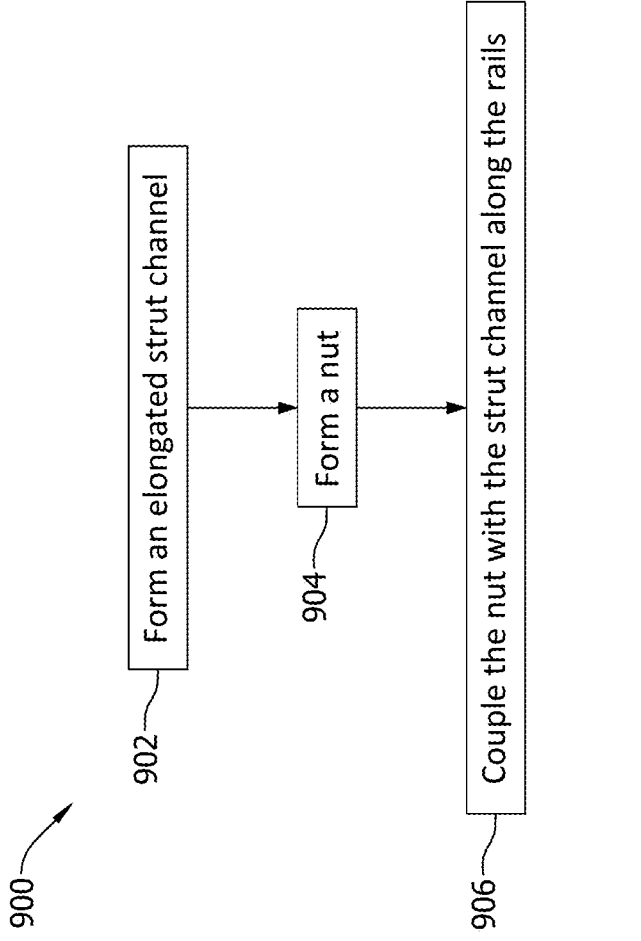
FIG. 9 is a flow chart of an example method of assembling strut channel assemblies shown in FIGS. 2A-8E.

FIG. 9 is a flow chart of an example method 900 of assembling a strut channel assembly. In the example embodiment, the method 900 includes forming 902 a strut channel. Example strut channels are strut channels 204 disclosed herein The method 900 also includes forming 904 a nut. Example nuts are nuts 202 disclosed herein. The method further includes coupling 906 the nut with the strut channel along the first longitudinal rail and the second longitudinal rail.

At least one technical effect of the systems and methods described herein includes (a) a strut channel having rails for coupling with a nut; (b) a rail having a profile resembling letter V; (c) rails of a strut channel that facilitate self-centering of a nut in the strut channel; (d) a strut channel assembly having a nut with wings and a strut channel with slots; (e) a strut channel assembly having a nut with grooves.

Example embodiments of strut channel assemblies and methods of assembling strut channel assemblies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A strut channel assembly for constructing a heavy-duty trapeze system in an industrial facility, the strut channel assembly comprising:
    an elongated strut channel comprising:
        a bottom wall; and
        a first side wall and a second side wall extending from the bottom wall and facing one another, the first side wall forming a first longitudinal rail, the second side wall forming a second longitudinal rail facing the first longitudinal rail, each of the first longitudinal rail and the second longitudinal rail comprising:
        a first elongated rail surface; and
        a second elongated rail surface intersecting the first elongated rail surface at a non-zero angle, wherein:
            the first longitudinal rail and the second longitudinal rail are configured to facilitate sliding of a nut thereon, and
            the first elongated rail surface is perpendicular to the second elongated rail surface.

2. The strut channel assembly of claim 1, wherein the first longitudinal rail has a profile resembling letter V.

3. The strut channel assembly of claim 1 further comprising:
    a nut positioned inside the strut channel and slidably coupled with the strut channel along the first longitudinal rail and the second longitudinal rail.

4. The strut channel assembly of claim 3, wherein the first longitudinal rail and the second longitudinal rail are configured to self-center the nut in the strut channel.

5. The strut channel assembly of claim 1, wherein a profile of the strut channel when viewed from a front of the strut channel is symmetrical.

6. The strut channel assembly of claim 1, wherein the first longitudinal rail is positioned further inward than a remainder of the first side wall, and the second longitudinal rail is positioned further inward than a remainder of the second side wall.

7. The strut channel assembly of claim 1, wherein the first elongated rail surface is at 45° angle with a remainder of the first side wall.

8. A strut channel assembly for constructing a heavy-duty trapeze system of an industrial facility, the strut channel assembly comprising:
    an elongated strut channel formed as one single piece, the strut channel comprising:
        a bottom wall; and
        a first side wall and a second side wall extending from edges of the bottom wall along a longitudinal direction of the bottom wall, the first side wall and the second side wall facing one another, the first side wall forming a first longitudinal rail, and the second side wall forming a second longitudinal rail facing the first longitudinal rail, wherein:
        the first longitudinal rail and the second longitudinal rail each comprise a first elongated rail surface that intersects a second elongated rail surface, and
        the respective first elongated rail surface is perpendicular to the respective to the second elongated rail surface; and
    a nut positioned inside the strut channel and coupled with the strut channel along the first longitudinal rail and the second longitudinal rail.

9. The strut channel assembly of claim 8, wherein longitudinal slots are defined in the first side wall and the second side wall.

10. The strut channel assembly of claim 9, wherein the nut comprises:
    a nut body;
    a first wing extending from a first end of the nut body; and
    a second wing extending from a second end of the nut body, the second end positioned opposite the first end, wherein the first wing and the second wing are received in the longitudinal slots.

11. The strut channel assembly of claim 9, wherein the first side wall further comprises a rib.

12. The strut channel assembly of claim 9, wherein the first side wall defines a plurality of longitudinal slots.

13. The strut channel assembly of claim 8, wherein the nut comprises:
    a nut body defining a first groove at a first end of the nut body and a second groove at a second end of the nut body, the second end positioned opposite the first end.

14. The strut channel assembly of claim 13, wherein longitudinal slots are defined in the first side wall and the second side wall, the strut channel assembly further comprising a nut holder, the nut holder comprising:
    a holder body; and
    a tab extending from the holder body and sized to be received in one of the longitudinal slots and one of the first groove and the second groove,
    wherein the nut holder couples the nut to the strut channel, with the holder body positioned outside the strut channel.

15. The strut channel assembly of claim 13, wherein each of the first longitudinal rail and the second longitudinal rail further comprises a longitudinal ledge sized to be at least partially received in one of the first groove and the second groove.

16. The strut channel assembly of claim 15, wherein each of the first longitudinal rail and the second longitudinal rail further comprises a plurality of longitudinal ledges.

* * * * *